Figure 1:
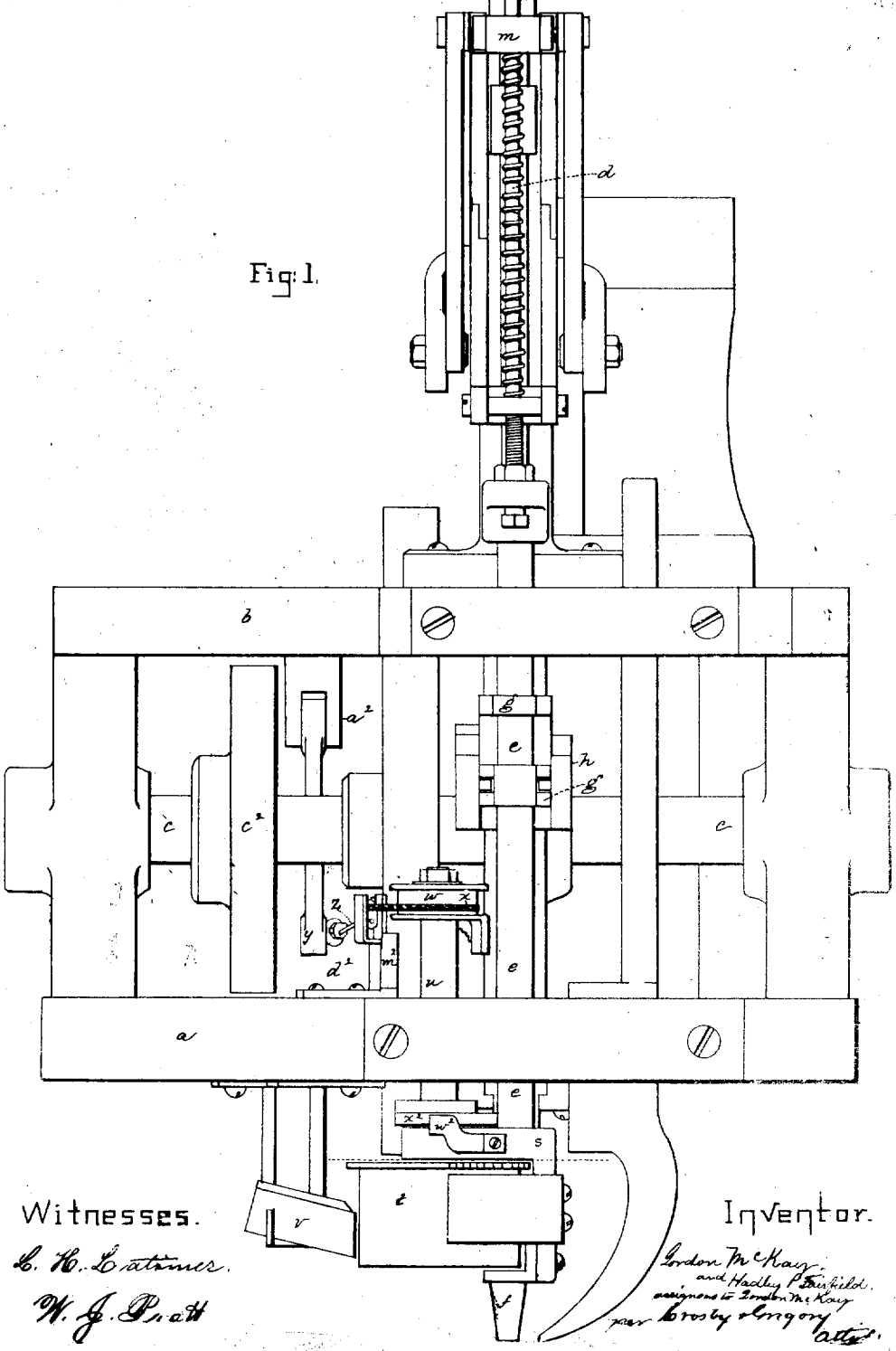

4 Sheets—Sheet 1.

G. McKAY & H. P. FAIRFIELD.

NAILING-MACHINES FOR BOOTS AND SHOES.

No. 7,014. Reissued March 28, 1876

Witnesses.

C. H. Eatonner.

W. J. Pratt

Inventor.

Gordon McKay and Hadley P. Fairfield, assignors to Gordon McKay per Crosby & Gregory Attys.

4 Sheets—Sheet 2.

G. McKAY & H. P. FAIRFIELD.

NAILING-MACHINES FOR BOOTS AND SHOES.

No. 7,014. Reissued March 28, 1876.

Witnesses.

E. H. Gratiner.

H. J. Pratt.

Inventor.

Gordon McKay & Hadley P. Fairfield
assignors to Gordon McKay.
per Crosby & Gregory
Attys.

4 Sheets—Sheet 3.

G. McKAY & H. P. FAIRFIELD.

NAILING-MACHINES FOR BOOTS AND SHOES.

No. 7,014. Reissued March 28, 1876.

Witnesses.

L. H. Loutimer.

W. J. Pratt.

Inventor.

Gordon McKay & Hadley P. Fairfield.

assignors to Gordon McKay.

per Crosby & Gregory attys.

4 Sheets—Sheet 4.

G. McKAY & H. P. FAIRFIELD.

NAILING-MACHINES FOR BOOTS AND SHOES.

No. 7,014. Reissued March 28, 1876.

Witnesses.

L. H. Latimer

W. J. Pratt.

Inventor.

Gordon McKay & Hadley P. Fairfield.
assignors to Gordon McKay
per Crosby & Gregory attys.

UNITED STATES PATENT OFFICE

GORDON McKAY, OF CAMBRIDGE, AND HADLEY P. FAIRFIELD, OF BOSTON, MASSACHUSETTS, ASSIGNORS TO GORDON McKAY.

IMPROVEMENT IN NAILING-MACHINES FOR BOOTS AND SHOES.

Specification forming part of Letters Patent No. 155,962, dated October 13, 1874; reissue No. 7,014, dated March 28, 1876; application filed March 13, 1876.

*To all whom it may concern:*

Be it known that we, GORDON McKAY, of Cambridge, Middlesex county, and HADLEY P. FAIRFIELD, of Boston, Suffolk county, all in the State of Massachusetts, have invented certain Improvements in Nailing-Machines; and we do hereby declare that the following, taken in connection with the drawings which accompany and form part of this specification, is a description of our invention sufficient to enable those skilled in the art to practice it.

Heretofore the nail used in nailing-machines has usually been cut in the machine to the length required by the thickness of the particular parts to be united by it, such nail being sometimes cut from a continuous wire, and sometimes from a continuous or ribbon-like plate; but in the present invention the nails are formed of different lengths prior to entering the machine, and with or without heads, and are placed in separate receptacles attached to the machine, from which they are transferred to position to be driven, and the sole and upper are united by metal fastenings, each corresponding in length to the thickness of parts to be united by it.

This invention consists, primarily, in the combination, in a nailing-machine and with its nail tube and driver, of nail-receptacles—two or more—adapted to receive and support separate nails of different lengths, to be used in different portions of the stock, according to the length of nail required.

The drawing represents the part of the machine which directly embodies the organization and details of organization embracing our invention.

Figure 2:
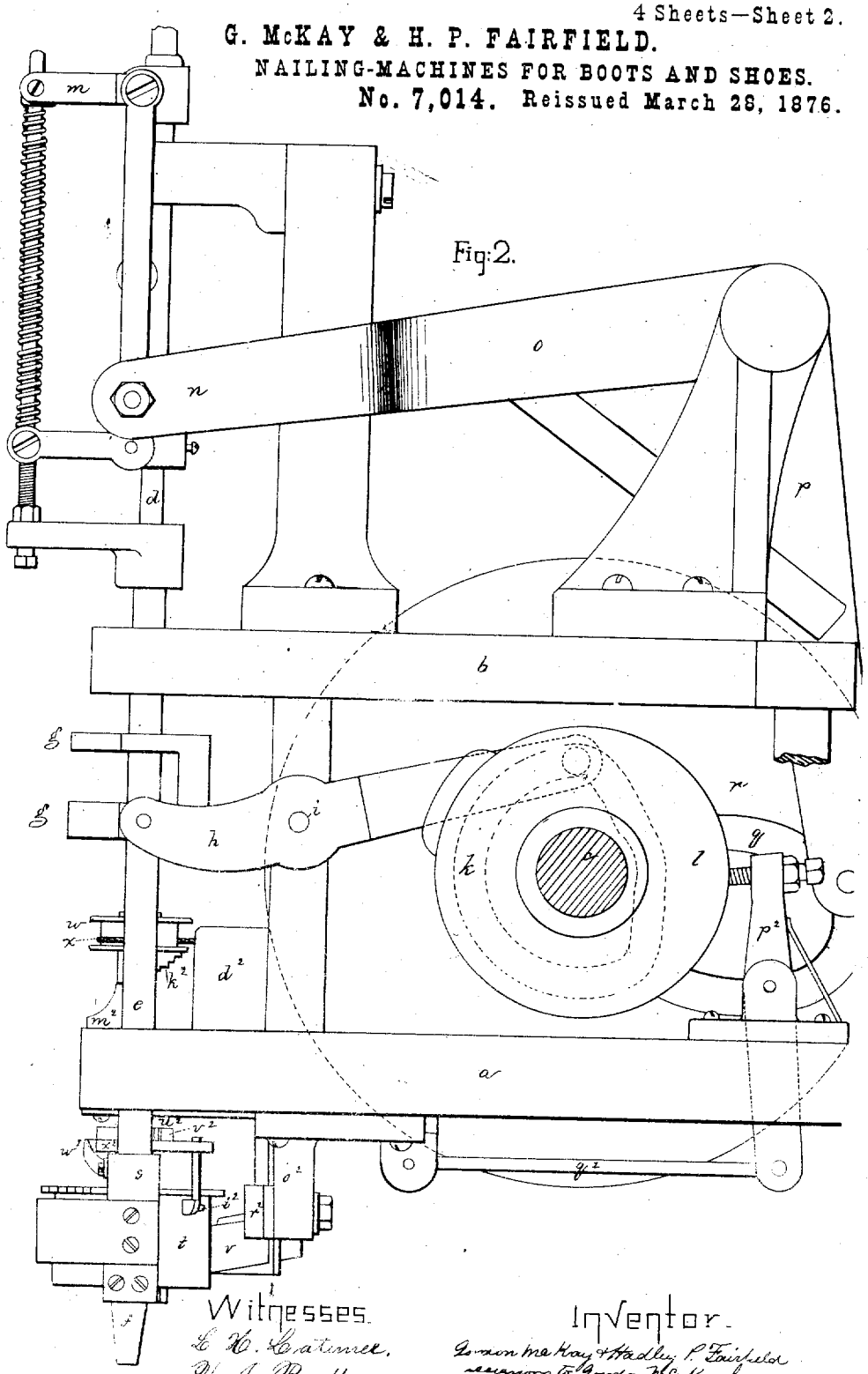
Figure 3:
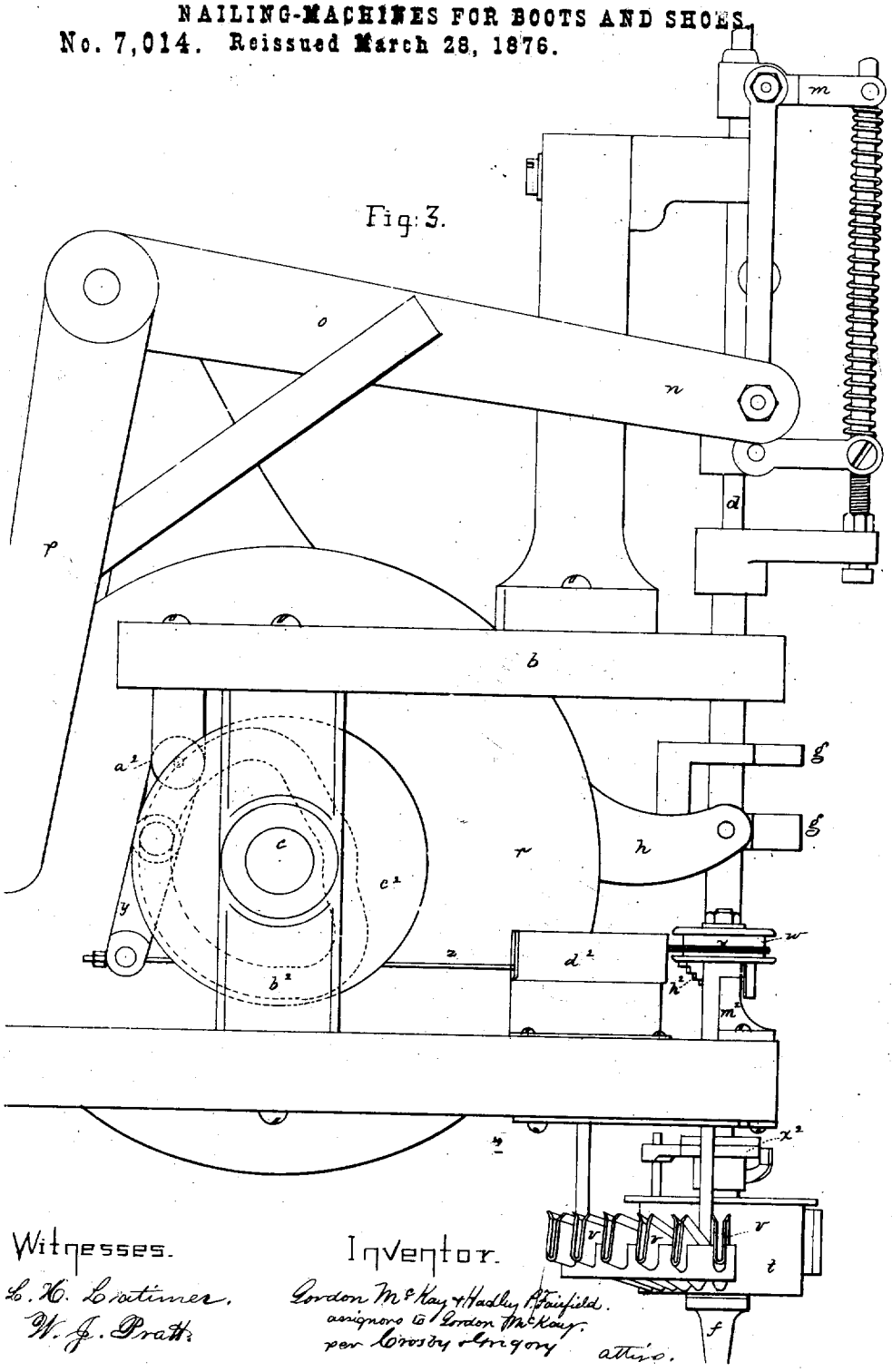
Figure 4:
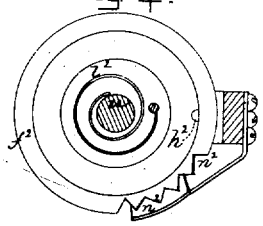
Figure 5:
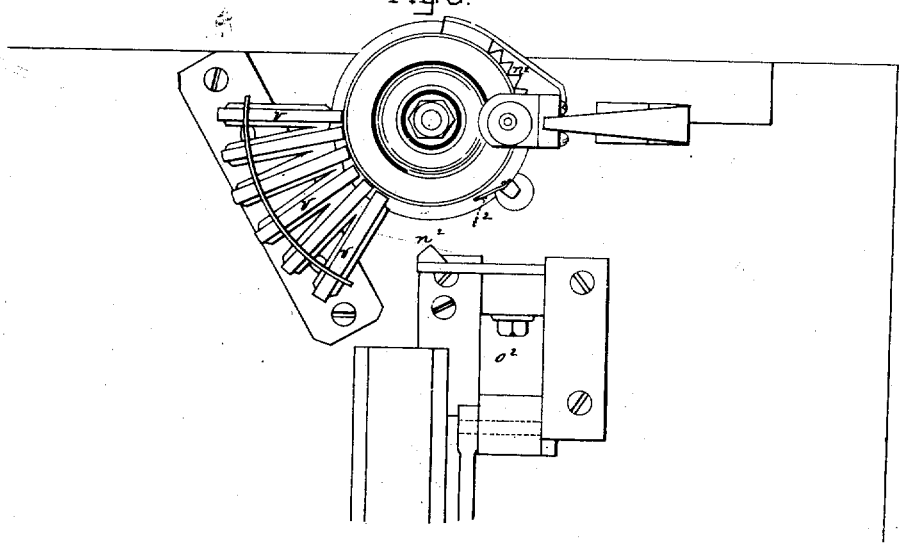
Figure 6:
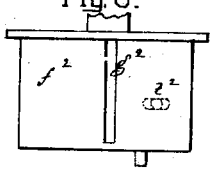

Figure 1 shows the mechanism in front elevation. Fig. 2 is a side view thereof. Fig. 3 is an opposite side elevation. Fig. 4 is a plan of the nail receiving and transferring mechanism. Fig. 5 is a reverse plan of the same. (Seen in the direction of the arrow in Fig. 2.)

Two pillar-plates, *a b*, and their stands constitute the stationary frame-work of the machine, and sustain in suitable stationary bearings the driving-shaft *c*. The driver-bar *d* works within the tube *e*, extended through the pillar-plates, and is provided at its lower end with a nail tube or foot, *f*, and mechanism to receive and present nails to be driven. This nail-tube foot is raised or lowered through a lever, *h*, having its fulcrum at *i*, and connected with arms *g* fixed to the tube, a pin or roll on the lever entering a cam-groove, *k*, cut in the side of the cam-wheel *l* on the driving-shaft, as in United States Letters Patent No. 76,150. The nail-tube, each time it is lifted by the lever *h*, raises the nail-tube foot above the surface of the shoe to a determined distance, while at each descent thereof it rests upon the surface of the shoe, at whatever height such surface may be, thereby calipering the thickness of the parts to be nailed between the nail-tube foot and the work-support, the latter being always in a fixed stationary position when the nail-tube foot descends upon it. By these devices we are enabled to supply nails in varying length as the parts to be nailed vary in thickness.

The driver-bar is fastened at its upper end to an arm, *m*, extending from an arm, *n*, of a lever, *o*, whose other arm, *p*, has a roll or pin extending from it into a cam-groove, *q*, of a cam-wheel, *r*, on the driving-shaft *c*. The bar *d* is directly fastened to the arm *m*, or through an intervening connection, as seen in the drawing. In the intervening connection a supplementary bar and tripping mechanism are used, so that the driver-bar, as it descends, is stopped when the bottom of the driver-bar meets the upper surface of the work—or, in other words, when the driver has driven the nail through, so that the outer end of the nail and the outer surface of the shoe are flush.

This tripping mechanism has already been described in an application for a patent made or to be made by us, and need not herein be further alluded to.

The nail-tube *e*, below the bottom pillar-plate, has a vertical arm, *s*, which extends around a carrier or box, *t*, through and by which the nails of different lengths are supported and are transferred from the nail-receptacles to the nail-tube, the tube *e* extending through the pillar-plate into the arm, which has a passage for the driver, and thence into and through a vertical passage made through the nail-carrier, and thence into the nail-tube foot, the nail-passage being through the top of the carrier and the side, and thence into the nail-tube foot, the passage being in the axial line of the driver-tube *e*.

The nail-carrier *t* is fixed on the foot of a vertical shaft, *u*, extending through a bearing in the arm *s*, and also through a bearing in the bottom pillar-plate, in which latter bearing the shaft is made movable vertically, while it is made rotative in both bearings. On the side of this carrier *t*, opposite the nail-tube, is a series of vertical nail-receptacles, *v*, which are herein shown as stationary. These receptacles may contain nails of various lengths, placed in them in accordance with the length of the respective nails to be used. The nail-receptacles converge toward the nail-box, and preferably descend toward it, as seen in Fig. 3. The nail-box shaft *u* has fixed upon its upper end a wheel, *w*, upon which winds a chain, *x*, connected to the bottom of a lever, *y*, by a suitable rod, *z*. This lever has its fulcrum at its upper end, as seen at $a^2$, and between its upper end and the rod *z* it has a pin or roll extending into a cam-groove, $b^2$, in one face of a cam-wheel, $c^2$, fixed on the driving-shaft. The chain-wheel is made with a groove and flanges that allow the chain to slip vertically without running off the wheel, and a guide, $d^2$, may be used to keep the chain and rod in position. After a nail is driven and before the shoe to be nailed is fed forward, the nail-tube and box are raised to permit free movement of the shoe, and the nail-tube thrown down by the lever *h* after the feed of the shoe, stops at the point where it strikes the upper surface of the upper sole, such point being higher or lower, accordingly as the parts to be united are more or less thick. This leaves the nail-carrier, which moves vertically with the nail-tube, more or less near to the bottom of the lower pillar-plate, and through the position of the box, with relation to the lower pillar-plate, a nail of greater or less length is taken from the nail-receptacle, the connection for effecting the result being as follows: The box or carrier *t* is formed in two cylindrical parts or rings. In the outer ring $f^2$ is a vertical slot, $g^2$, extending through the ring, and to the outer surface of the inner ring, in which surface is made a vertical nail-carrying groove, $h^2$, that forms a part of the nail-tube, when the parts are in position to bring the groove into line with the nail-tube. When the carrier is in position to bring the slot and groove opposite the nail-receptacles, (the slot being open through to the groove) a suitable spring or finger, $i^2$, presses a nail from one of the receptacles through into the nail-receiving groove $h^2$ of the carrier. The nail having been thus placed, the shaft *u* is turned, bringing the nail-groove $h^2$ and its nail into vertical line with the nail-tube above, and the nail-tube foot below, suitable devices holding the parts in relative position for the action of the mechanism in receiving a nail, and in transferring it to position where it is received, and to position when the nail is driven.

The mechanism herein shown for selecting from the nail-receptacles a nail corresponding most nearly to the thickness of the material, and its operation, is as follows: On the under side of the chain-wheel *w* is a series of steps, $k^2$, differing from one another in height as the nails used in nailing vary in length. Preferably this variation should be one-sixteenth of an inch at each nail-trough, and the horizontal distances of the steps are so arranged that when the stepped wheel *w* is brought over the nail-receptacles *v* the vertical lines of the steps and the nail-receptacles will correspond radially. The chain *x*, which is worked by the cam $c^2$, revolves the wheel *w* in one direction, while it is moved in the other direction by the coiled spring $l^2$. Thus its rotation, by means of the spring, may be arrested in any position, or when the groove $g^2$ is opposite any of the nail-troughs *v*. There is a stop, $m^2$, fixed to the plate *a*, against which one of the steps, $k^2$, strikes when the outer carrier ring $f^2$ is rotated by the coiled spring, and the height of the wheel *w* determines which of the steps shall arrest the rotation of the wheel *w*, and also of the carrier *t*, and the height of the wheel *w* is determined by the thickness of the stock through the tube *f*.

The upper rim of the outer ring $f^2$ of the carrier has notches $n^2$ cut in it, corresponding radially with the nail-receptacles *v* and the steps $k^2$. A sliding piece, $o^2$, worked by a projection on the cam *l*, through the lever $p^2$ and rod $q^2$, pushes the V-shaped end $r^2$ of the sliding piece into one of the notches $n^2$, in the rim of the carrier, after the nail-chamber $h^2$ is placed to receive the nail, and this brings the slot $g^2$ opposite the nail-carrying groove $h^2$. In order that this groove $h^2$ may pass by the nails presented by the troughs *v*, that intervene between the driver and the nail-trough, opposite which groove $h^2$ is stopped by the steps—that is, supposing a nail is required from the fifth trough or receptacle, it must pass the first four without taking a nail—the outside ring $f^2$ of the nail-carrier is allowed to move a little over the inner cylinder, the amount of the motion being regulated by the pin and slot $t^2$, and when this pin is at either end of the slot, the groove $h^2$ being closed, the nail-carrier will pass by the first four nails in the case supposed without taking a nail; then, when arrested opposite the fifth nail-trough, the piece $o^2$ adjusts the opening $g^2$ and admits a nail, and the rotation of the carrier, returning to the driver, closes the opening $g^2$ and retains the nail in the carrier. There is a spring, $i^2$, that is carried by the rotation of the flange $x^2$, through the action of the pin $u^2$ in the slot $v^2$, and which is controlled by the friction-pad $w^2$. This spring, being elevated and depressed with the nail-carrier, is so adjusted in height that it will pass over the tops of the intervening nails, and stop at the one opposite the slot $g^2$, when that is in position to receive the nail. This spring passes back of the nail to be selected, and, as the slot $g^2$ is opened, pushes the nail into the groove $h^2$.

Where nails are to be used having enlarged heads the spring $i^2$ should be placed below the nail-troughs and made to extend upward, and the nails, supported by their heads on the inclined flanges of the troughs, may be left with their lower ends projecting or exposed beyond the sides of the nail-troughs, so that the spring $i^2$, entering between the nail next the nail-carrier and the next one back of it, will, as it passes them, press each one toward the nail-carrier; but the opening $g^2$ being closed, (until after it has been placed in position to take the proper nail,) only the right one will be taken into the groove $h^2$.

In this machine we use the horn, for supporting the shoe, described in other United States patents, or the shoe may be held on a last; and we use also an automatic-feed like the one described in United States Letters Patent No. 36,163.

We claim—

1. In a nailing-machine, the combination, with the nail tube and driver, of nail-receptacles adapted to receive and support separate nails of different lengths.

2. A series of nail-receptacles adapted to sustain nails of different lengths, and with or without heads, in combination with a carrier to remove a nail from either of the receptacles to a position in line with the driver by which it is to be driven, and with a driver to drive the nail from the carrier.

3. A series of nail-receptacles adapted to sustain and guide separate nails of different lengths, in combination with a nail tube and driver, and with mechanism to present the nails singly to the nail-tube in line with the driver, substantially as described.

4. The nail tube and driver and receptacles to contain separate nails of different lengths, in combination with mechanism adapted to select the nails to be driven, according to the thickness of the stock to be united, substantially as described.

5. The combination of the inner and outer rings of the nail-carrier with the notched flange and the piece $o^2$, to open the receptacle for the nail after it is in the proper position to receive the nail, and close it when passing the nail-troughs in either direction, substantially as described.

6. A reciprocating nail-carrier, in combination with steps $k^2$, governed as to their position according to the thickness of the stock, and adapted to regulate the movement of the carrier with relation to the nail-receptacles and nail tube and driver, substantially as described.

GORDON McKAY.
HADLEY P. FAIRFIELD.

Witnesses:
FRANK F. STANLEY,
FRED. C. SHEPARD.